United States Patent
Uhlenbrock

(10) Patent No.: US 6,858,051 B2
(45) Date of Patent: Feb. 22, 2005

(54) DEVICE FOR SEPARATING A FLUID FROM A GAS STREAM

(75) Inventor: Dietmar Uhlenbrock, Tecklenburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/431,095

(22) Filed: May 7, 2003

(65) Prior Publication Data

US 2004/0040272 A1 Mar. 4, 2004

(30) Foreign Application Priority Data

Aug. 28, 2002 (DE) .......................................... 102 39 408

(51) Int. Cl.⁷ ............................................. B01D 29/21
(52) U.S. Cl. ............................. 55/321; 55/324; 55/325; 55/330; 55/498; 55/502; 55/514; 55/521; 55/DIG. 19; 123/573; 210/493.1; 210/493.2; 210/493.5; 210/450
(58) Field of Search .......................... 55/321, 324, 325, 55/330, 498, 502, 521, DIG. 19, 385.3, 337, 432, 355, 520, 527; 123/573, 198 E; 210/493.1, 493.2, 493.5, 450, 411, 406, 108, 111, 113, 304, 312, 313, 258

(56) References Cited

U.S. PATENT DOCUMENTS

| | | | |
|---|---|---|---|
| 2,511,967 A | * 6/1950 | Campbell | 55/355 |
| 2,514,623 A | * 7/1950 | Brown | 55/355 |
| 5,769,911 A | * 6/1998 | Van De Vijvere | 55/355 |
| 5,879,552 A | * 3/1999 | Bradfield | 210/411 |
| 6,221,136 B1 | * 4/2001 | Liu et al. | 96/66 |
| 6,387,142 B1 | * 5/2002 | Pieciak et al. | 55/493 |
| 6,461,397 B1 | * 10/2002 | Billiet | 55/498 |
| 6,478,858 B2 | * 11/2002 | Angermann et al. | 96/143 |
| 6,635,095 B2 | * 10/2003 | Tanaka | 55/337 |
| 6,723,149 B2 | * 4/2004 | Ernst et al. | 55/498 |

FOREIGN PATENT DOCUMENTS

| | | |
|---|---|---|
| DE | 196 45 666 A1 | 5/1998 |
| DE | 19720775 A1 | 11/1998 |

* cited by examiner

*Primary Examiner*—Minh-Chau T. Pham
(74) *Attorney, Agent, or Firm*—Michael J. Striker

(57) ABSTRACT

With known devices for separating oil in the crank housing ventilator, oil is collected on a refined gas side of a filter, which in operation of an internal combustion engine, often cannot drain off. In this manner, the liquid level increases, so that the filter is increasingly clogged by the oil. Finally, the oil is carried away from a gas stream. In this manner, the oil use of the internal combustion engine greatly increases. With the device of the present invention, the oil collected on the refined gas side is collected in a liquid storage unit (10), whereby the liquid storage unit (10) is protected from the stream, so that the gas stream can not carry away oil any longer. The device includes a support body (9), which is impermeable to the stream by means of a cut-off wall (23), in order to prevent a carrying-off of the oil.

11 Claims, 3 Drawing Sheets

DEVICE FOR SEPARATING A FLUID FROM A GAS STREAM

BACKGROUND OF THE INVENTION

The present application relates to a device for separating a liquid from a gas stream.

DE 197 20 775 A1 discloses a device for separating a liquid from a gas stream for a crank housing vent. In a filter mat of the device, oil drops are separated from a blow-by gas. The oil separated in the filter mat runs downward by a low blow-by gas volume stream based on the force of gravity through the filter mat and drops off the filter mat. With a high blow-by gas volume stream, the liquid separated in the filter mate is carried off by the blow-by gas. In this manner, newly formed drops are generally larger than previously, so that they immediately fall off on a refined gas side. There, oil is collected on the refined gas side of the filter mat. Because of a stream pressure of the blow-by gas, the oil only can run with a still internal combustion engine or with very low blow-by gas volume stream back on a crude gas side of the filter mat. If the oil level increases to the refined gas side, since the oil cannot run off, the danger exists that the filter surface is clogged partially by oil, the collected oil is carried off by the blow-by gas, is carried to an intake manifold of the internal combustion engine, and is burned in the internal combustion engine, which naturally represented a oil loss that is to be avoided. In addition, the oil component, such as, for example, hot film anemometer, turbo charger, and the supercharger intercooler in the intake manifold and other aggregates, can be damaged.

The oil collected on the refined gas site can be returned via a refined gas site oil return into a crank housing, such as, for example shown in DE 197 20 775 A1 or DE 196 45 666 A1. Since a pressure difference exists between the crank housing and the refined gas side of the device, a short circuit current through the oil return from the crank housing on the refined gas side is to be avoided. For this purposed, a siphon can be used, for example. It is disadvantageous on a refined gas side oil return that the pressure difference between the crank housing and the refined gas side of the device is greater than the pressure difference between the crank housing and the crude gas side of the device, so that also the siphon must have a greater length and requires more structural space.

SUMMARY OF THE INVENTION

The device according to the present invention for separating of liquids from a gas stream, in contrast, has the advantage that in a simple manner, an improvement is achieved that reduces or prevents a carrying-off of separated liquid on the refined gas side, in which a liquid storage unit that is protected by means of a cut-off wall from a gas current is provided on the refined gas side. As long as the liquid storage unit does not overflow, the gas stream can no longer carry off the liquid from the liquid storage unit.

It is advantageous to connect the cut-off wall as one piece with a support body, in order to reduce the manufacturing costs.

It is also advantageous if the cut-off wall of the liquid storage unit or the liquid storage unit has at least one return opening, such that the separated liquid reliably runs off from the liquid storage unit and can prevent an overflow.

In addition, it is advantageous if the liquid storage is connected with the crude gas side of the filter element by means of at least one return opening, since between the crank housing and the crude gas side, a small pressure difference exists than between the crank housing and the refined gas side. An oil return between the crude gas side and the crank housing can have a smaller siphon a siphon required in an oil return arranged between the pure gas side and the crank housing, so that much structural space can be saved.

It is further advantageous if the at least one return opening is covered by a filter element, such that the gas stream loaded with the liquid can only be filtered on the refined gas side.

In addition, it is also advantageous if the filter element and the support body are cylindrical or flat, since in this manner, depending on the customer's wish, the geometry of the device can be adapted to the space ratios in the engine chamber.

Furthermore, it is advantageous to use a filter mat as the filter medium, since filter mats also can reliably separate very small liquid drops, so that the efficiency of the device of the present invention is very high.

Moreover, it is advantageous is the liquid storage unit is cup-shaped, since this is particularly cost-effective from a manufacturing technology perspective.

It is also advantageous if the liquid storage unit has a small volume and an overlying large volume, since in this manner, more liquid can be stored.

DETAILED DESCRIPTION OF THE PREFERRED EMBODIMENTS

The device of the present invention for separating liquid from a gas stream preferably serves for separating liquids, in particular, oil particles, from a gas stream and can also be used generally for separating drops of liquids from flowing gases.

The device of the present invention is preferably used in a crank housing ventilator. A negative or low pressure in an intake manifold of an internal combustion engine is used, in order to suction a gas loaded with oil, which during an operation of the internal combustion engine, based on a small leakage between pistons, piston rings, and working surfaces of a cylinder, flows from a combustion chamber in the crank housing, from the crank housing in the device to an oil separator. The gas loaded with oil is designed as blow-by gas. In the following description, the blow-by gas will only be referred to as gas or gas stream. After the oil is removed from the gas, the gas of a suction current is to be mixed, by a diesel engine with a turbocharger, for example, between an air mass gauge and the turbocharger.

By the leakage of gas from the combustion chamber of the combustion engine, an impermissible pressure increase occurs in the crank housing, so that it is necessary to perform a pressure balancing by means of the so-called crank housing ventilator. Since the gas has a high hydrocarbon concentration, it is not possible that the gas can be emitted into the atmosphere. The crank housing ventilator leads the gas, therefore, into the intake manifold of the internal combustion engine, so that combustion is performed there. In the crank housing, an oil mist exists with many small and large oil particles by means of the gas flowing in with a high flow speed and by means of the moving parts in the crank housing. These oil particles must be separated in the crank housing ventilator with the assistance of a device for separating liquids, in order to avoid a high oil loss and in order not to negatively affect the combustion.

Figure 1:
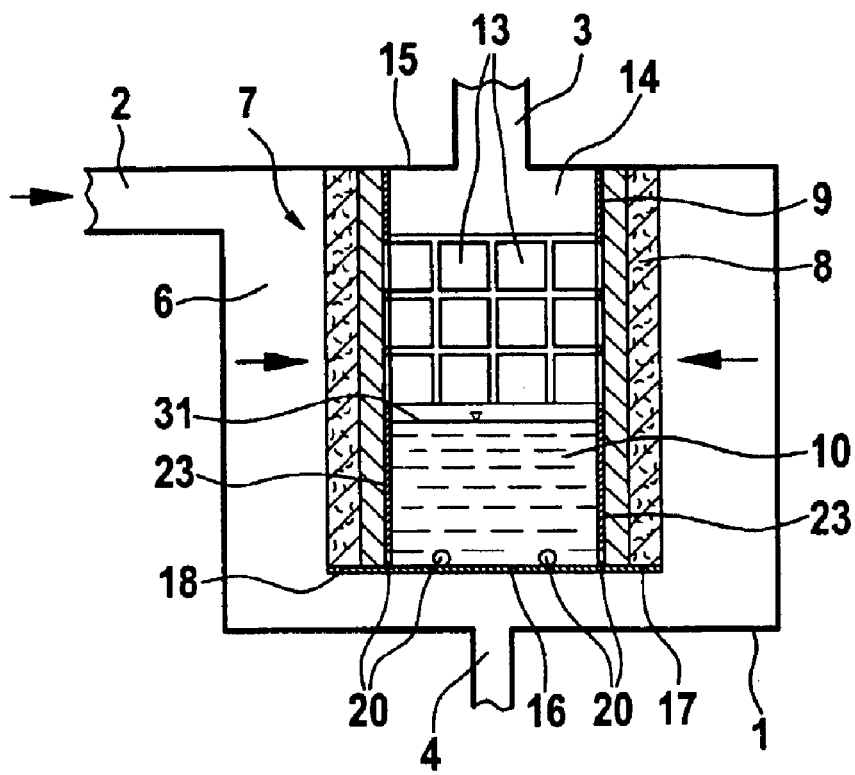
FIG. 1 shows a view of a first embodiment of the present invention with a cylindrical cut-off wall.

FIG. 1 shows a device according to the present invention for separating of liquids, in particular, oil. The device comprises a housing 1 with an inlet channel 2, a gas outlet 3, and a liquid outlet 4. The inlet channel, indirectly connected with the crank housing, opens into an interior chamber of the housing 1. In the interior chamber 6, a cylindrical filter element 7 is arranged. The filter element 7, for example, can be fixed in the housing 1 by means of retention with a form-fit or a force-fit. The filter element 7 comprises a filter medium 8 that is radially outwardly arranged that can be two-layered, for example, a radially inwardly connected support body 9, and a liquid storage unit 10. The filter medium 8 is a fine filter and comprises, for example, a fiber mat or a fiber yarn.

A region downstream of the filter medium 8 is designated as the refined gas side; a region upstream of the filter medium 8 is designated as the crude gas side.

The crude gas side and the refined gas side are connected to one another only via the filter medium 8.

For support and fixing of the filter medium 8, the support body 9 is connected radially inward to the filter medium 8. The support body 9 has facing the gas outlet 3 a net-type or grid-like structure with a plurality of grid openings 13, which, for example, are rectangular. They can also be round, square, or oval, however. Facing away from the gas outlet 3, the support body 9 is closed by means of a cut-off wall 23, which is formed as a watertight, cylindrical wall, and which forms the cup-shaped liquid storage unit 10 with a floor 16 connected with the wall. The cut-off wall 23 is a part of the support body 9, whereby the support body 9 and the cut-off wall 23 are connected as one piece with one another. It is also possible, however, that the cut-off wall 23 and the support body 9 are two parts separated from one another. The support body 9 is made from a plastic or metal, for example.

The liquid storage unit 10 is therefore formed by the cut-off wall 23, which partially covers the filter medium 8 in the axial direction on the refined gas side, and the floor 16. Radially on the periphery, at least one return opening 20 is provided in the cut-off wall 23. The at least one return opening 20 is arranged near or directly on the floor 16, such that the liquid held in the liquid storage unit 10 can completely flow off to the crude gas side.

Radially within the support body 9, a cylindrical filter interior chamber 14 is formed, which is connected with the gas outlet 3. From the interior chamber 6 of the housing 1, the gas stream flows through the filter medium 8 and the grid openings 13 of the support body 9 in the filter interior chamber 14 and from there, to the gas outlet 3.

With a front face of the filter element 7 facing the gas outlet 3, the filter element 7 sealingly rests on a housing wall 15 of the housing 1. A front face 18 of the filter element 7 facing the gas outlet 3 is sealingly closed by the floor 16 of the support body 9. The floor 16 of the support body 9, for this purpose, has an overhanging floor edge 17, which extends radially outward over the filter medium 8.

On the side of the housing 1 facing the floor 16, a liquid outlet 4 is arranged with spacing.

The inlet channel 2 is, for example, at least indirectly connected to the crank housing (not shown). The blow-by gas moves into the housing 1 and flows through the filter element 7 radially from outside to the inside. The liquid held in the gas is filtered out in the filter element 7.

With a low gas volume current, the liquid of the gas stream is separated in the filter medium 8 and moves, based on its gravity, in the filter medium downward, runs or drops over the floor edge 17 into the housing 1, and moves in the liquid outlet 4, which is at least indirectly connected to the crank housing (not shown). The oil, then, can flow back over the liquid outlet 4 again into the crank housing.

With a high gas volume stream, the liquid is carried off by the gas through the filter element 7. The large drops formed thereby, because of their inactivity on the refined gas side, are immediately separated on the support body 9 and flow or fall downward, where they collect in the liquid storage unit 10. A liquid level 31 forms, which during the operation of the internal combustion engine, increases with a high gas-volume current, since, based on the higher pressure on the pure gas side, no liquid can run back from the liquid storage unit 10 through the at least one return opening 20 on the crude gas side. The volume of the liquid storage unit, therefore, must be selected to be sufficiently large such that an overflow is avoided. The liquid storage unit 10 for a passenger vehicle, for example, has a volume of between 5 and 30 cubic centimeters, and for cargo vehicles, a volume of approximately 5 to 50 cubic centimeters.

The liquid in the liquid storage unit is protected in the current direction from the gas stream and can not be carried away, since it lies in the region protected from the gas flow and the cut-off wall is impermeable, up to an including at least one return opening 20 for the gas current. The size and number of the return openings 20 is chosen to be small, such that a carrying-off of liquids by the gas eventually flowing through the return openings 20 is not possible. The cut-off wall 23, for example, can have one to eight return openings, each having diameters of two to four mm. The size and number of the return openings 20, however, also can be different. The separated oil, in the resting state of the internal combustion engine or with a minimal gas-volume current from can drop back from the filter medium 8 and moved through the at least one return opening 20 into the housing 1, and from there, back over the crude gas side liquid outlet 4 into the crank housing.

The at least one return opening 20 is covered by the filter medium 8, such that the unrefined gas can only be filtered on the refined gas side. The floor edge 17 prevents the gas from taking a short-cut through the filter medium 8 into the return opening 20. The gas must completely flow through the filter medium 8 in its layer thickness, in order to eventually move to the return opening 20.

The gas refined from the liquid leaves the housing 1 via the gas outlet 3, which is connected with the cylindrical filter interior chamber 14 and at least indirectly, is connected to an intake manifold of the internal combustion engine.

Figure 2:
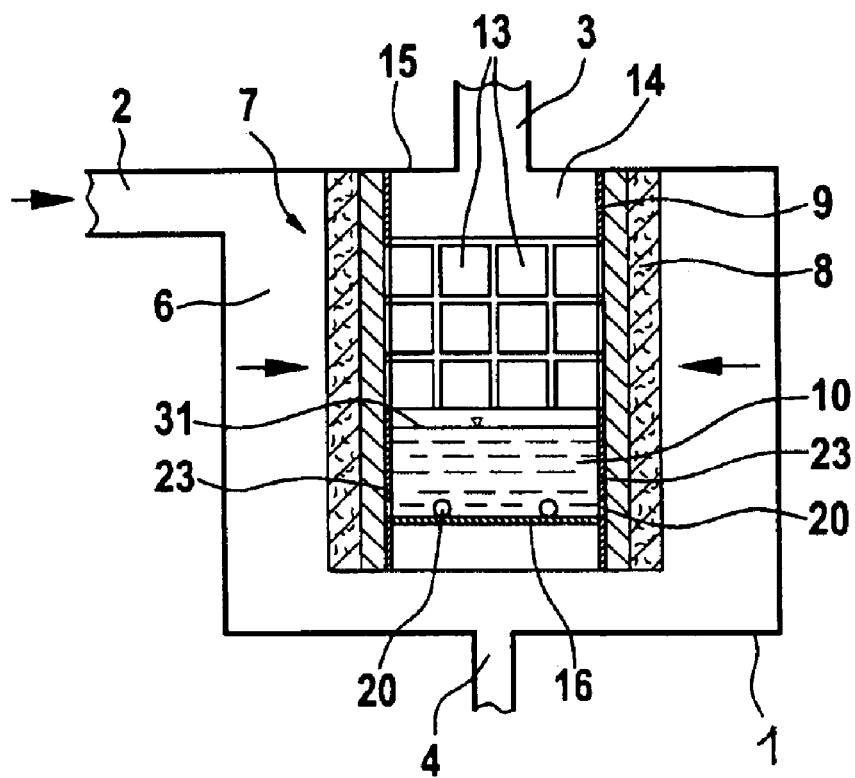
FIG. 2 shows a view of a second embodiment of the present invention with a cylindrical cut-off wall and an averted floor.

With the device for separating liquids according to FIG. 2, the same parts or those parts which operate the same as those of the embodiment shown in FIG. 1 are designated with the same reference numerals.

The device for separating liquids according to FIG. 2 differs from the device of FIG. 2 in that the floor 16 and the return openings 20 are displaced axially in the direction of the gas outlet 3. The floor edge 17 can be eliminated in this embodiment, since the filter medium 8 now extends over the floor 16 in the direction of the liquid outlet 4, so that the path for the gas for the gas axially through the filter medium 8 to the return openings 20 now is at least as long as is the path radially through the filter medium 8 to the return openings 20. Thus, no possibility for a short-cut exists any longer. If the liquid runs through the return openings 20, it is absorbed downwardly by the filter medium 8 in the direction of the liquid outlet 4 and drops off finally on the end of the filter medium 8 facing the liquid outlet 4. Through the dropping-off, a suction effect exists in the filter medium 8, by means of which liquid is drawn out of the liquid storage unit 10, so that the running off of the liquid from the liquid storage unit 10 is favorable.

Figure 3:
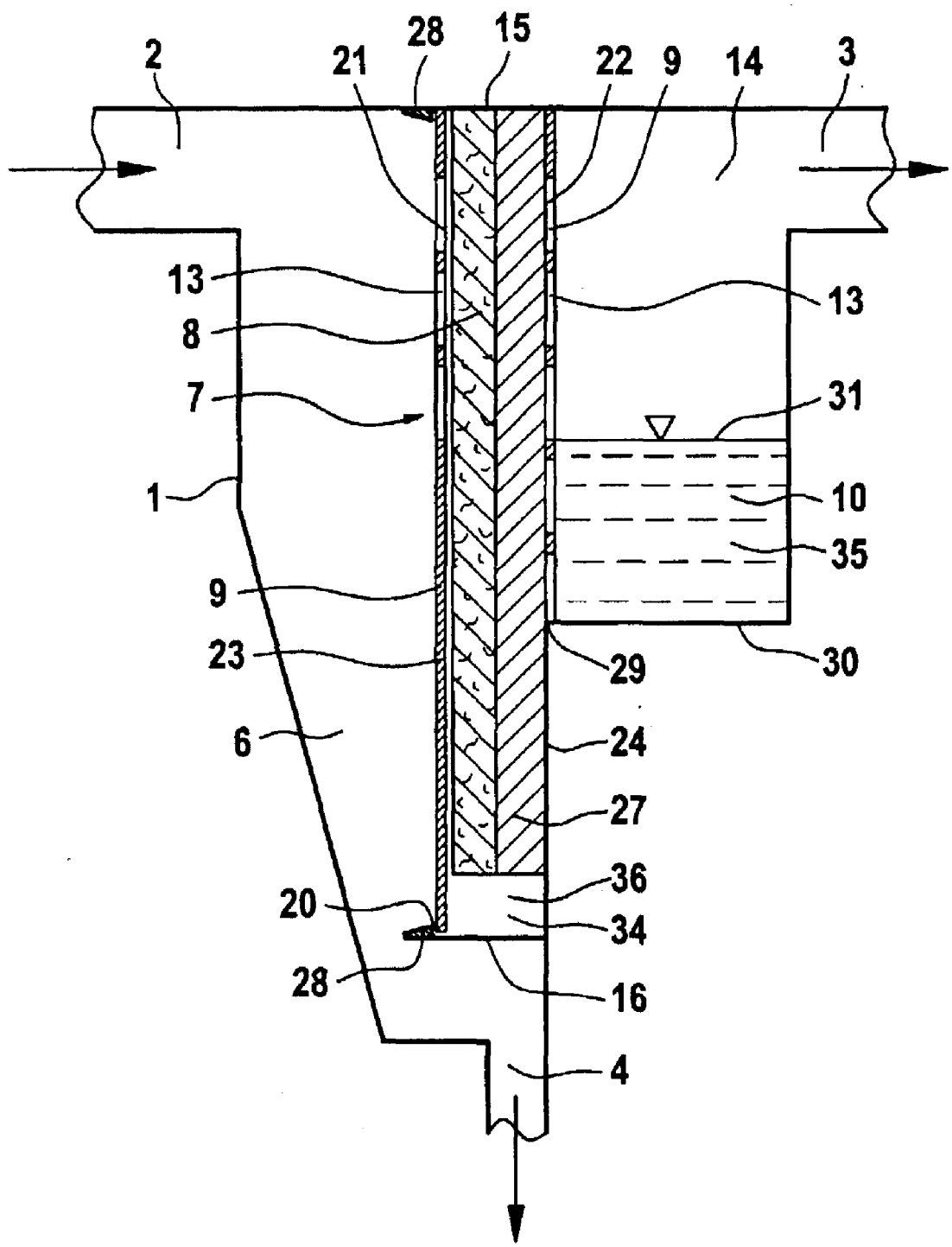
FIG. 3 shows a view of a third embodiment with a flat cut-off wall on a crude gas side.

With the device for separating liquids according to FIG. 3, the same parts or those parts which operate the same as those of the embodiments shown in FIGS. 1 and 2 are designated with the same reference numerals.

The device for separating liquids according to FIG. 3 differs from the devices for separating liquids according to FIG. 1 and FIG. 2, in that the filter element 7 is flat. The support body 9 comprises two flat, netlike support body walls 21, 22, which support the filter medium 8 and are fixed into position by pressing. The first support body wall 21 is arranged on the crude gas side on the filter medium 8, and the second support body wall 2 is arranged on the refined gas side on the filter medium 8. In a region of the support body wall 21 facing the liquid outlet 4, the cut-off wall 23 is provided, which rests flat on the filter medium 8. The cut-off wall 23 is connected as one piece with the first support body wall 21, for example, and covers only a part of the filter medium 8 in the axial direction.

The filter medium 8 rests on a graduated offset 24 of the housing 1 on the side facing the liquid outlet 4 with a partial piece 27. The filter medium 8 on the side facing away from the liquid outlet 4 rests on the housing wall 15 and is further bordered by the first support body wall 21, the second support body wall 22, the cut-off wall 23, the graduated offset 24, and the floor 16, which extends from the graduated offset 24 of the housing 1 in the region of the liquid outlet 4.

The first support body wall 21, for example, is releasably clipped into the housing 1 between the housing wall 15 and the floor 15 by means of engagement hooks 28. However, it can also be connected nonreleasably, for example, by means of adhesive or soldering.

On an edge of the graduated offset 24, the housing 1 has a projection 30 directed away in the flow direction from the filter element 7. The second support body wall 22 begins on the edge 29 and reaches to the housing wall 15. Also, the second support body wall 22 can be releasably or nonreleasably arrange din the housing 1.

The crude gas side and the refined gas side are separated from one another in the housing 1 by the filter element 7 and the floor 16. The liquid storage unit 10 is therefore formed by the floor 16, the cut-off wall 23, and the walls of the housing 1, for example, the graduated offset 24 and the projection 30. The liquid storage unit 10 comprises a small volume 34 in the axial direction between the floor 16 and the edge 29 and a large volume 35 above the edge 29.

The refined gas side of the device is connected with the gas outlet 3 in the housing 1 downstream of the filter medium 8. Liquid retained in the gas is filtered out in the filter medium 8. With a low gas volume current, the liquid moves based on its gravitational force through the filter medium 8 downward, runs over the floor 16 and the return opening 20 into the housing 1, and moves into the liquid outlet 4, which at least indirectly is connectable to the non-illustrated crank housing. The at least one return opening 20, for example, can be a gap between the floor 16 and the lower end of the cut-off wall 23.

With a high gas volume current, the liquid from the gas in the region of the grid openings 13 is carried off through the filter element 7. The large drops formed thereby, because of their sluggishness, are immediately separated on the refined gas side and collected in the large volume 35 of the liquid storage unit 10. The collected liquid penetrates first in the filter medium 8 covered by the cut-off wall 12 and runs then through the filter medium 8 into the small volume 34 in the direction of the floor 16 and is there stowed away. Through the axial distance between the floor 16 and the filter medium 8, a drip off chamber 36 is formed, in which liquid from the filter medium 8 can drip off. In this manner, a suction effect is achieved in the filter medium 8 above the drip off chamber 36 and the large volume 35 is suctioned. The liquid level 31 increases then from the floor 16 in the direction of the edge 29. First, if the small volume 34 is filled and the liquid level 31 exceeds the edge 29, the overlying large volume 35 of the liquid storage unit 10 is filled.

Figure 4:
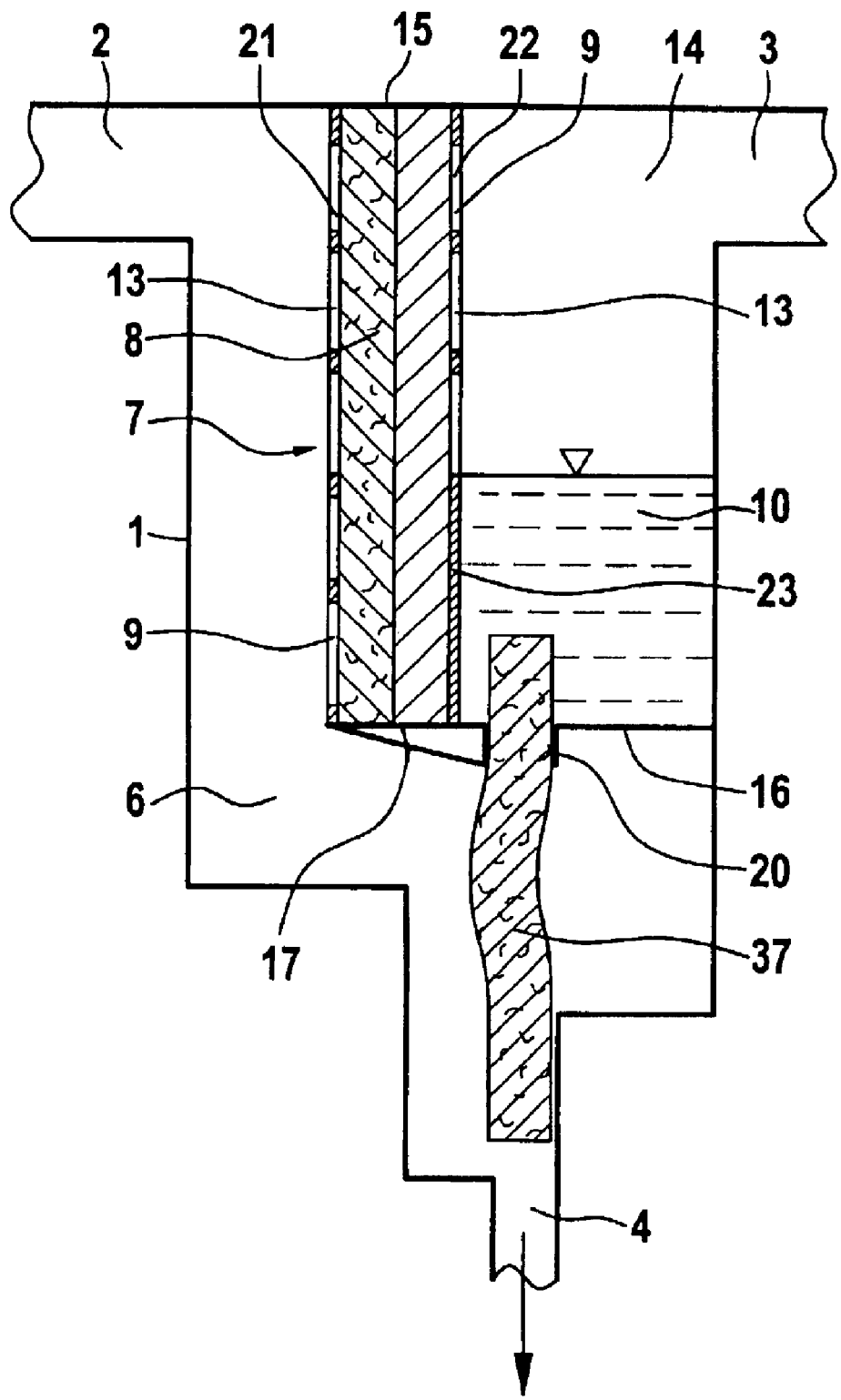
FIG. 4 shows a view of a fourth embodiment with a flat cut-off wall on a refined gas side.

With the device for separating liquids according to FIG. 4, the same parts or those parts which operate the same as those of the embodiments shown in FIGS. 1, 2, and 3 are designated with the same reference numerals.

The device for separating liquids according to FIG. 4 differs from the device according to FIG. 3, in that the cut-off wall 23 is arranged on the refined gas side. The first support body wall 21 has a completely net-like or grid-like structure. In one region of the second support body wall 23 facing the liquid outlet 4, the cut-off wall 23 is arranged. The second support body wall 22 and the cut-off wall 23, for example, are connected to one another as one piece.

The floor 16 and the projection 30 of FIG. 3 lie in FIG. 4 at a height and form a floor 6, which resting on the filter medium 8 extends from the first support body wall 21 to the right wall of the housing 1. In the floor 1, a return opening 20 is arranged. In the return opening 20, a filter mantle 37 in the form of a wick is arranged, which is connected with the liquid in the liquid storage unit 10 and reaches with its length also into the crude gas side interior chamber 6 of the housing 1. The filter mantle 37, for example, comprises a fiber mat. The liquid in the liquid storage unit 10, with the resting state of the internal combustion engine or with a minimal gas volume current, can flow off and drip off over the filter mantle 37. By means of the filter mantle 37, a suction effect is achieved. The liquid dripped off from the filter mantle 37 in the direction of the liquid outlet 4 draws further liquid from the liquid storage unit 10. In this manner, the running off of the collected liquid from the liquid storage unit 10 can take place similarly quickly. The filter mantle 37 filters the gas with a gas flow, which flow through the return opening 20 on the refined gas side, so that no unrefined gas can move unfiltered through the return opening 20 on the refined gas side.

The liquid in the liquid storage 10 moves in the described manner on the crude gas side of the housing 1 and from there, out into the liquid outlet 4.

It will be understood that each of the elements described above, or two or more together, may also find a useful application in other types of constructions differing from the types described above.

While the invention has been illustrated and described herein as a device for separating liquids from a gas stream, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for separating a liquid from a gas stream, comprising a housing with an inlet channel, a gas outlet and a liquid outlet, a filter element with a filter medium, a crude gas side and a refined gas side, and at least one support body supporting the filter element, wherein the device has a liquid storage unit with a cut-off wall on the refined gas side of the filter element, wherein the cut-off wall partially covers a filter medium, and wherein a return opening is provided for returning the liquid from the liquid storage to the crude gas side of the housing and is covered by the filter element.

2. The device according to claim 1, wherein the cut-off wall is connected as one piece with the support body.

3. The device according to claim 1, wherein the cut-off wall has at least one return opening.

4. The device according to claim 1, wherein the liquid storage unit is connected with the crude gas side of the filter element via at least one return opening.

5. The device according to claim 1, the filter element and the at least one support body are cylindrical.

6. The device according to claim 1, wherein the filter element and the at least one support body are flat.

7. The device according to claim 1, wherein the filter medium is a filter mat.

8. The device according to claim 1, wherein the liquid storage unit is embodied as cup-shaped with a floor and a floor edge extends over a front face of the filter medium.

9. The device according to claim 1, wherein the liquid storage unit is embodied by a small volume and a large volume overlying the small volume.

10. A device for separating a liquid from a gas stream, comprising a housing with an inlet channel, a gas outlet and a liquid outlet, a filter element with a filter medium, a crude gas side and a refined gas side, and at least one support body supporting the filter element, wherein the device has a liquid storage unit with a cut-off wall on the refined gas side of the filter element, wherein the cut-off wall partially covers a filter medium, and wherein a return opening is provided for returning the liquid from the liquid storage to the crude gas side of the housing and is covered by a further filter element.

11. The device according to claim 10, wherein the further filter element is a wick-like filter mantle.

\* \* \* \* \*